United States Patent Office 3,496,789
Patented Feb. 24, 1970

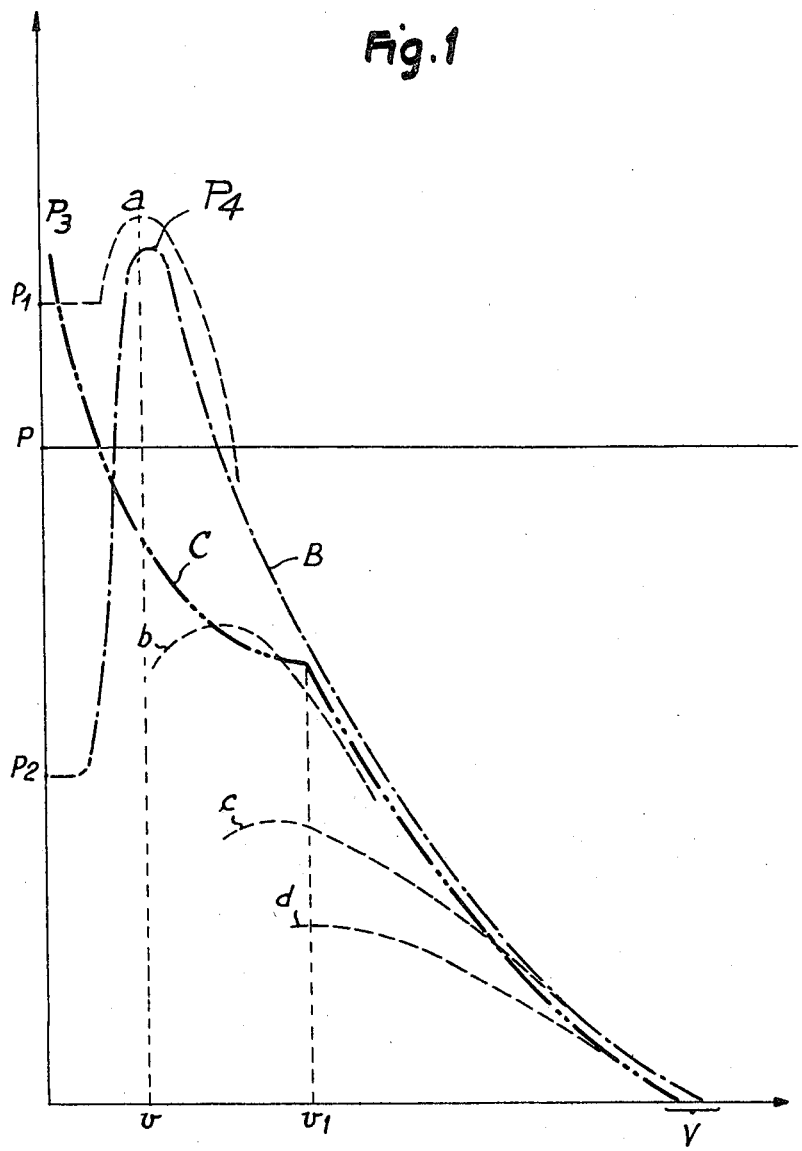

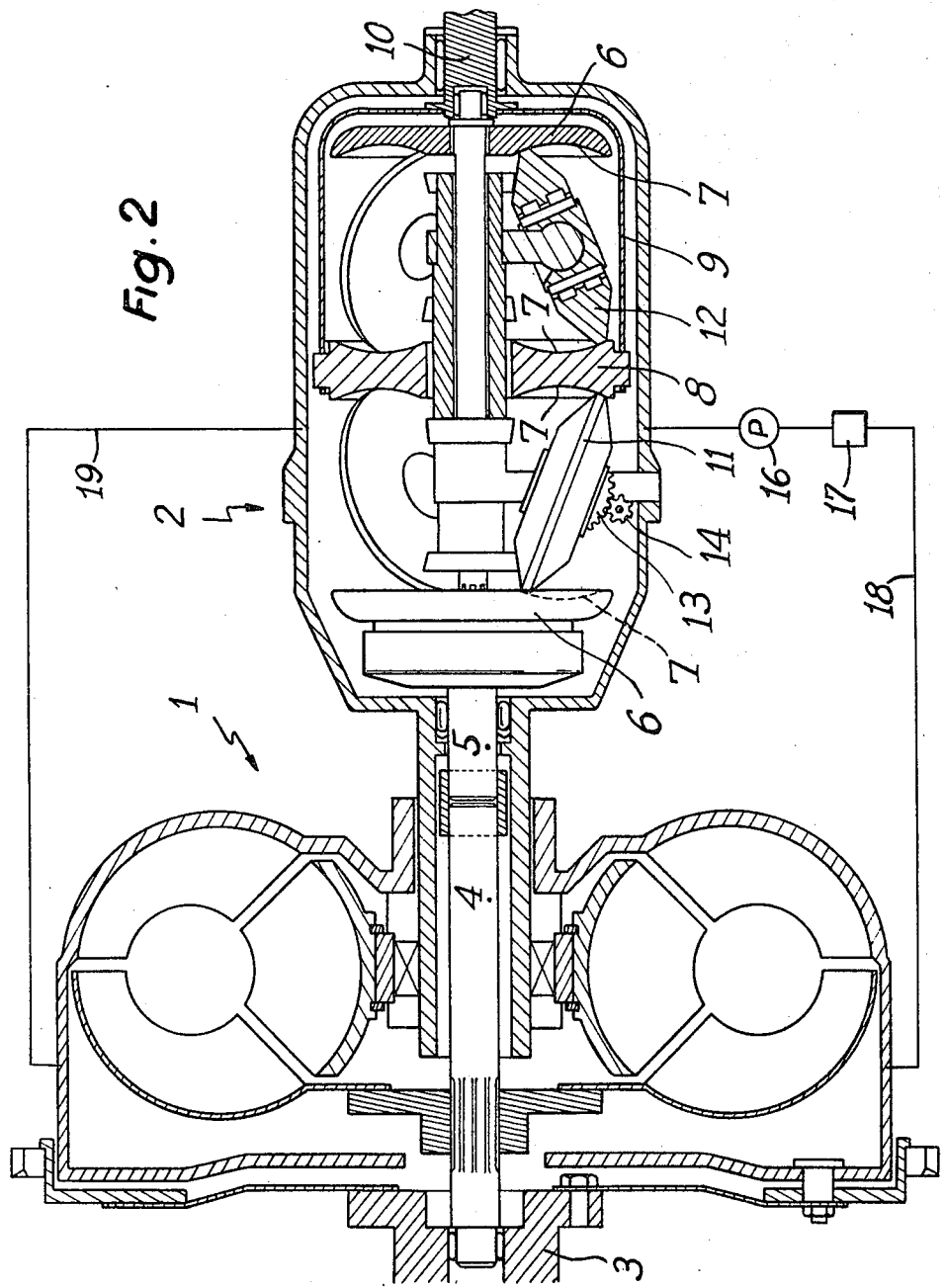

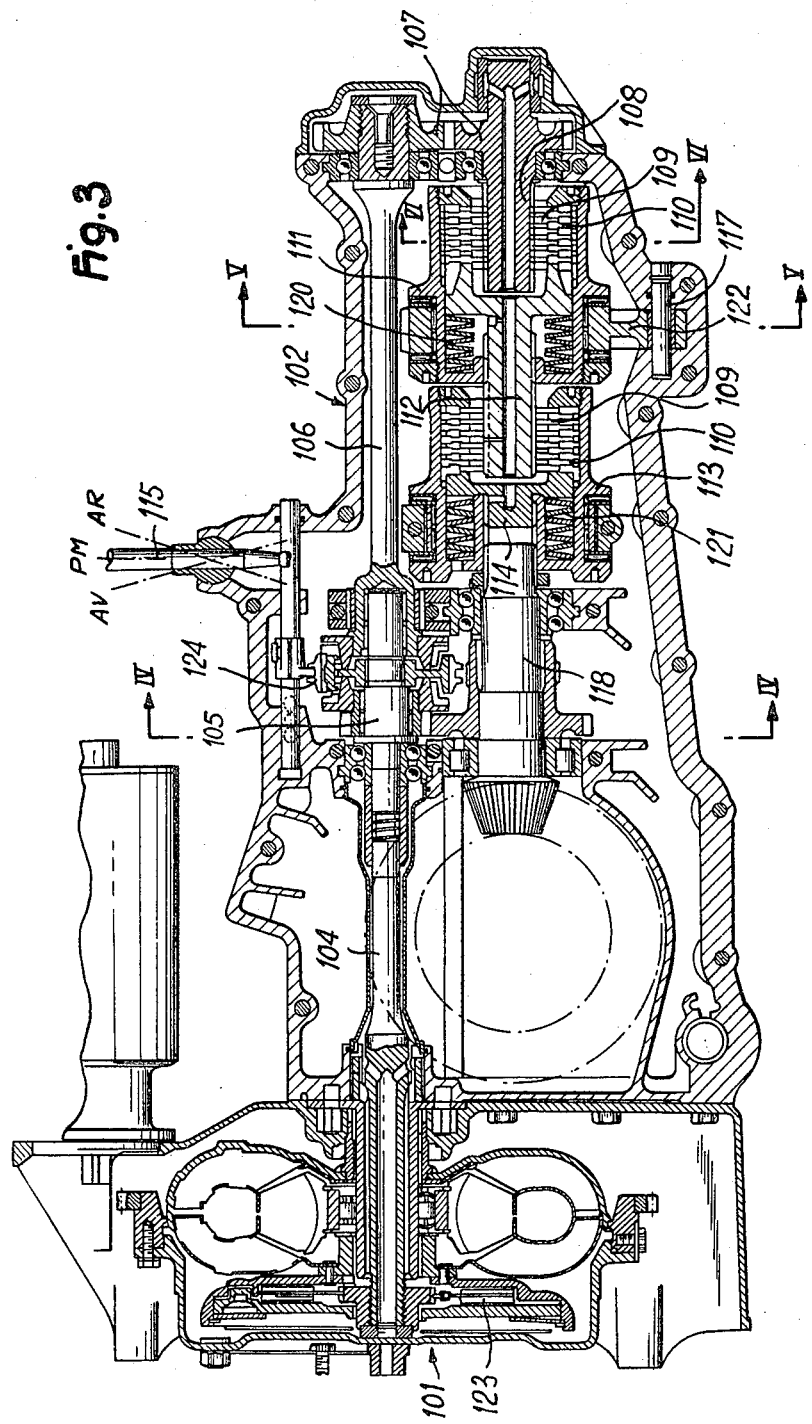

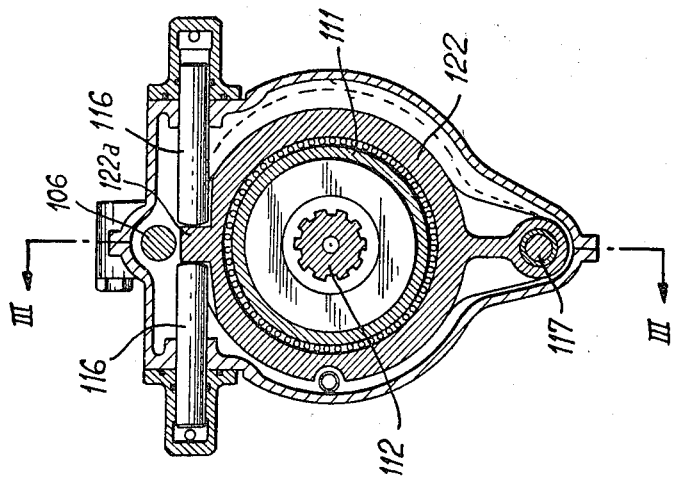
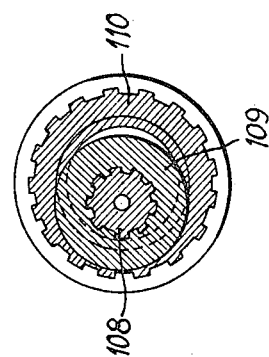
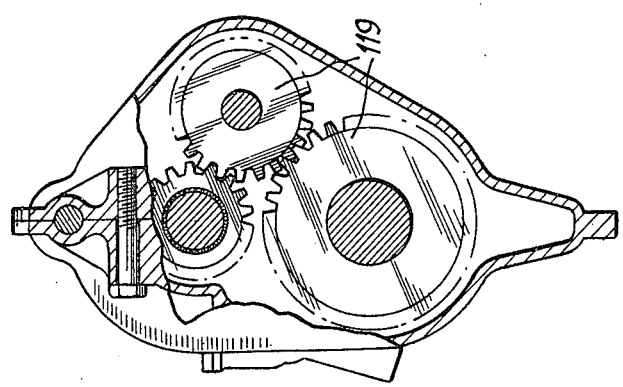

3,496,789
POWER TRANSMISSION DEVICE WITH VARIABLE PROGRESSIVE SPEED
Edmond J. G. Henry-Biabaud, Paris, France, assignor to Societe Anonyme Andre Citroen, Paris, France, a French society
Filed June 26, 1967, Ser. No. 648,624
Claims priority, application France, June 27, 1966, 67,116
Int. Cl. F16h 15/10, 37/06, 47/00
U.S. Cl. 74—730     2 Claims

ABSTRACT OF THE DISCLOSURE

A power transmission device having a hydraulic torque converter with its output shaft coupled to the input shaft of a speed changer and with the gear reduction range of the speed changer and the gear reduction range of the torque converter being so arranged that the ratio thereof lies between 0.6 and 1.5.

---

It is known that it is advantageous in motor vehicles, for any required power, to rotate the engine within a fairly restricted optimum range of speed, whatever the speed of movement of the vehicle. Up to the present time, endeavours have been made to arrive at this result by interposing between the engine and the wheels a power transmission such as a gear box with stepped ratios, hydraulic torque converters, speed changers, etc.

From this point of view, the speed changers are particularly advantageous to the extent where they are capable of ensuring a progressive variation of the rotational speed of the transmission shaft with respect to that of the driving shaft of the engine between a ratio of nil (stationary position of the vehicle) and a ratio equal to or even higher than 1 (maximum speed of the vehicle).

From among the different known types, mechanical friction or bearing (rolling) changers would be particularly useful for this purpose, but their use in motor vehicles is rendered very difficult by reason of the considerable friction which exists between their components when the vehicle is started up and whilst it is being driven slowly.

In other words, the characteristic B of a changer in a speed-acceleration or gradient, graph (FIGURE 1), has an ordinate at the origin $P_2$ situated a long way below the maximum $P_4$. Now, in practice, only the point $P_2$ is one of the fundamental data given to the constructor of a transmission device; the maximum $P_4$ is never sought for and in certain cases it constitutes more a disadvantage than anything else.

Moreover, it is extremely difficult to produce and maintain in a good state of service a mechanical friction or bearing (rolling) changer of which is frequently required to produce a low output speed in comparison with its input speed. The difficulties are further increased if this changer is required to furnish, at an extremely low output speed, the high torque necessary for starting up the vehicle.

In any case, the majority of known transmission devices with speed changers, designed for use on motor vehicles, require a clutch which may be disengaged under the action of a control pedal when the engine is started up or the vehicle is started, stopped or reversed. However, it has already been proposed, for example in French Patent No. 842,853 filed on 1st September, 1938, to eliminate this pedal, but there, convenience is the major object. This is realized because the driver's clutching function is eliminated and because the changer functions automatically. To this end, the above-mentioned patent essentially proposed mechanically replacing the disengageable clutch by a hydraulic coupling device, without modifying the characteristics of the changer.

The studies pursued for several years both on mechanical changers and on torque converters have led the inventor to envisage their simultaneous use in the same transmission device for a vehicle.

The invention thus has for its object a power transmission between an engine and the wheels of a vehicle, with which transmission there is incorporated a mechanical speed changer whose range of variation is relatively small, thus reducing the difficulties in production as well as the bulk of the device and resulting in a mechanism which is dependable.

A transmission with variable progressive speed between an output speed of zero and a maximum output speed according to the invention comprises, in combination, a hydraulic converter and a mechanical speed changer, the output shaft of the first being coupled to the input shaft of the second, whilst the gear reduction range $D_v$ of the mechanical speed changer and the gear reduction range $D_c$ of the hydraulic converter are such that $D_v/D_c$ is between 0.6 and 1.5.

In other words, the mechanical changer only has to effect a fraction of the total gear reduction, so that this gear reduction takes place between an input shaft and an output shaft of which the relative differences of rotation are relatively small. The gear reduction between the shafts where the greatest slip is produced, particularly upon starting up, is effected by the converter. Thus, a mechanical changer may be produced whose dimensions are fairly small, so that it may be associated with a converter which can transmit high torques without the total bulk of the transmission being prohibitive on a modern vehicle, even if it is a question of a touring vehicle.

According to an advantageous embodiment of the invention, the torque converter and the mechanical speed changer are fed by the same hydraulic circuit, the fluid thus serving as an element for transforming the torque and as a medium for cooling the whole of the transmission.

In order that the invention and its advantages may be more readily understood, more detailed explanations will be given, reference being made to the accompanying drawings, in which:

FIGURE 1 is a graph comparing the curves a, b, c, d, of the possible accelerations with a conventional gear box with four ratios, the curve B of the possible acceleration with a mechanical speed changer coupled with a mechanical clutch or with a hydraulic coupling device, and the curve C of the possible accelerations of a mechanical changer coupled with a torque converter, according to the invention;

FIGURE 2 is a longitudinal sectional view of a transmission device according to the invention comprising a speed changer with rollers and a toroidal race;

FIGURE 3 is a longitudinal sectional view of a transmission according to the invention comprising a speed changer with friction-discs;

FIGURE 4 is a sectional view along the line IV—IV of FIGURE 3;

FIGURE 5 is a sectional view along the line V—V of FIGURE 3; and

FIGURE 6 is a sectional view along the line VI—VI of FIGURE 3.

Referring now to the drawings, the graph 1 shows, on the y axis, the accelerations or, this amounting to the same thing, the gradients in percentage of the slopes on which a stopped vehicle may be restarted. The x axis indicates the speed in kilometres per hour of this vehicle.

For a given car, there exists, imposed by the programme which corresponds thereto, a value of the gradient, represented by the straight line P, below which the vehicle must be able to start up without fail.

The curves $a$, $b$, $c$, $d$, represent the accelerations available with a vehicle when one of the four ratios of a conventional gear box which are currently known as first, second, third and fourth gear, is used.

The curve $a$ shows in addition that the first gear permits starting up with a considerable gradient $P_1$, clearly higher than the imposed value P. At the other end of the scale, the fourth gear (curve $d$) enables a maximum speed V, also imposed, to be reached.

The curve B, in light dashed and dotted lines, corresponds to a mechanical speed changer which must of course cover the same range as the preceding box, from the stationary position up to the speed V. This changer is associated for example with a mechanical centrifugal clutch or with a hydraulic coupling device which completes the automatic functioning of the transmission.

It will be observed that the mechanical changer of the curve B substantially offers the same total gear reduction range as the preceding gear box, from the speed $v$ to the speed V. However, upon starting up, by reason, as has been said above, of the considerable internal friction which is produced there, this changer, with a gear reduction range which is as wide as that of a conventional gear box, cannot supply a sufficiently high torque to its output shaft. In practice, it can ensure the starting of the vehicle which has stopped on a slope only for a gradient of maximum value $P_2$, lower than the imposed value P. As soon as the vehicle begins to run, the loss of energy in the changer diminishes rapidly and, at speed $v$, the curve B has rejoined, or almost rejoined, the curve $a$. However, its insufficiency at the very moment of starting up renders this mode of transmission unusable, unless the changer be given an excessive dimensioning for normal running so that the point $P_2$ rejoins or passes the point P. However, difficulties of bulk, weight and cost are then overcome.

The curve C, in heavy dashed and dotted lines, relates to a transmission according to the invention composed of a mechanical changer combined with a hydrokinetic torque converter. The extent of the gear reduction goes, as previously, from the stationary state up to the speed V, but, as has been explained above, the total gear reduction is distributed between the two members. That of the mechanical changer approximately covers the range of the ratios $b$ to $d$ of the conventional gear box, from the speed $v_1$ to V so that it is substantially reduced compared with that of the preceding changer (curve B).

On the other hand, the supplementary gear reduction necessary for starting the vehicle is ensured by the converter whose torque multiplication, when the vehicle is moving slowly, is considerably greater than that of the mechanical changer of the curve B. With the transmission of the invention, a hill start is possible with a gradient $P_3$, even greater than the gradient $P_1$ of the conventional gear box.

In addition, it is necessary to emphasise that the combination of a converter and a mechanical changer enables the maximum $P_3$ of the characteristic of the changer to be eliminated. It may even be said that the respective gear reduction ranges of the converter and the changer can be determined by the maker so that this maximum $P_3$ will disappear.

The applicant, by the careful studies which he has made of this transmission, has been able to determine the ranges of the converter and the changer in the case of very different vehicles. The results of these studies are summarised in the following table which indicates the preferred values of the gear reduction ranges according to the nature of the vehicle. The inventor has ascertained that it was suitable to retain the ratio $D_v/D_c$ within relatively restricted limits, between 0.6 and 1.5 according to the vehicles, in order to benefit from the advantages of the invention.

The gear reduction range includes the concept of the total gear reduction between the torque converter 1 and the mechanical speed changer 2 in which the total gear reduction is distributed between the tow members. This gear reduction is enumerated in the table below with respect to the optimal speed of the engine.

In a touring vehicle in which the engine speed is reduced three to four times in the course of being transmitted to the drive wheels, the mechanical speed changer which is most directly associated with the drive wheels reduces the delivered r.p.m. 1.5 to 2.3 times from the torque converter. The torque converter which has received directly the output of the engine has reduced the engine r.p.m. 1.8 to 2.3 times. Thus, there is a ratio between the range of reduction of the mechanical speed changer $D_v$ to the range of gear reduction of the torque converter $D_c$ of approximately 0.6 to 1.0.

The product of $D_c \times D_v$ is equal to the total or overall gear reduction indicated in the second column of the table.

TABLE

| Vehicle | Overall gear reduction range | Maximum gear reduction range $D_v$ of the changer | Maximum gear reduction range $D_c$ of the converter | $D_v/D_c$ |
| --- | --- | --- | --- | --- |
| Touring | About 3 to 4 | 1.5 to 2.3 | 1.8 to 2.3 | 0.6 to 1. |
| Utility | About 8 | 2.5 to 3.2 | 2.0 to 2.5 | About 1.3. |
| Special engines | More than 8 | 3.0 to 4.5 | About 3 | 1.0 to 1.5. |

The main characteristics and the fundamental advantages of the invention have just been set forth; other practical advantages will appear in a study of the following description of embodiments of the invention.

The embodiment of the transmission according to the invention shown in FIGURE 2, is essentially constituted by a hydrokinetic torque converter designated by general reference 1, and a changer with rollers with toroidal race, designated by the general reference 2.

The converter 1 which is of known type will not be described in detail. Its input shaft is coupled to the end of the crank shaft 3 of an engine and its output shaft 4, is coupled to the input shaft 5 of the changer 2. This shaft 5 drives two driving discs 6 one face of each of which is grooved or made hollow to form toroid races 7. Halfway between the discs 6 there is located a third disc 8, both faces of which are grooved or hollowed to form toroidal races 7 identical to those in discs 6. The disc 8 is connected by a strut 9 to the output shaft 10 of the changer 2 which is at the same time the output shaft of the transmission.

Two sets of inclinable rollers 11 and 12 are mounted to rotate freely respectively between the discs 6 and 8 on either side of the disc 8. The rollers 11–12 between the discs roll on the toroid races 7.

A control means, a toothed segment 13 and a pinion 14 of which are seen, enables the inclination of the rollers 11–12 to be simultaneously varied within the limits of the extent of the races 7. It will be apparent that this extent determines the transmission range of the changer; the more the extreme values of the transmission ratio are separated from one, the more there are risks of friction of the rollers on their race, particularly upon staring, and the more it is difficult to displace the rollers in rest position in the absence of rotation of the changer.

The dimensions of the races 7 are reduced to a relatively small value since, as has been seen above, a fraction of the total gear reduction ratio is ensured by the converter 1.

The torque converter 1 and the mechanical speed changer 2 are fed by the same hydraulic circuit including, as shown diagrammatically in FIG. 2, a pump 16 and a cooling unit 17 in a conduit 18 connecting the converter 1 to the mechanical speed changer 2. The conduit 17 supplies cooling fluid under pressure to the mechanical speed changer 2. A conduit 19 returns the fluid to the torque converter 1.

FIGURE 3 shows a transmission device according to the invention composed essentially of a hydrokinetic torque converter similar to that of FIGURE 2 designated by the general reference 101 and of a mechanical changer with friction discs designated by the general reference 102.

The two members will not be described in detail as they are known per se.

The input of the converter 101 is coupled to the end of the crank shaft of an engine (not shown) and, at its output shaft 104 is coupled to the input shaft 105 of the changer 102.

The forward and reversing control is effected by a lever 115 to which is coupled a double synchronisation sliding pinion 124.

When the lever 115 is in forward running position, the shaft 105 is coupled by means of return pinions 107 to the central shaft 108 of the changer 102.

As is known, the shaft 108 supports a series of discs 109 capable of driving a series of discs 110 against which they are applied by a stack of resilient washers 120.

The discs 110 are in their turn integral in rotation with an intermediate part 111, fixed in rotation on an internal shaft 112. This latter supports a series of discs 109 capable of driving a series of discs 110 against which they are tightened by an end disc 114 under the effect of a stack of resilient washers 121. The last series of discs 110 is fixed in rotation on a ring 113 which is itself rendered integral with the output shaft 118 of the changer 2.

FIGURES 5 and 6 show how the gear reduction ratio may be varied. This ratio is a function of the relative eccentricity which may be given to the sets of discs 109 and 110 (FIGURE 6).

The intermediate part 111 of the first set of discs 109, 110 is mounted in a bearing 122, a lower extension of which is articulated to a shaft 117 (FIGURE 5).

Opposite the shaft 117, the bearing 112 has an operating finger 122a arranged between two opposite hydraulic jacks 116. By acting, due to these latter, in one sense or the other, the bearing 122 may be made to pivot about the shaft 117 and vary the relative eccentricity of the discs 109 and 110, and consequently the gear reduction ratio of the changer 2.

In order to reverse the vehicle, the lever 115 is placed in its reverse running position. In this case, the output shaft 104 of the converter 101 is coupled, by the sliding pinion 124, directly to return pinions 119 which drive the output shaft 118. The changer 102 is then not in service.

In the example described and shown, the converter 101 comprises a mechanical friction clutch 123 mounted on its output shaft 104. This clutch, controlled by known means (not shown) permits a total uncoupling of the engine and the transmission when it is desired to pass the lever 115 from one of its positions to the other.

For starting up the vehicle to move forward, the lever 115 is placed in the corresponding position. The discs 109 and 110 are then in the position shown in FIGURE 6, of maximum gear reduction. However, during the increase in the speed of the vehicle, the slip between the shaft of the engine and the wheels is ensured by the converter 101 between the point $P_3$ and the point corresponding, on the curve C, to the speed $v_1$. Between $v_1$ and V the increase in the speed of the vehicle results from the progressive displacement of the discs 109 with respect to the plates 110 under the effect of the pivoting of the bearing 112 in the sense of a diminution of the gear reduction ratio.

The application of the invention is of particular advantage in the case of transmissions of the type shown in FIGURE 3, i.e. of the "all forward" or "all reverse" type. In fact, it enables a speed changer to be used whose diametrical bulk is very small, so that the output shaft 104 of the converter (situated in line with the axis of the crank shaft) is located at a short distance above the axle of the wheels of the vehicle, this always being sought for by manufacturers The invention has been described and shown in its application to motor vehicles.

It will be apparent, however, that the invention can also be used with fixed installations.

I claim:
1. A power transmission device for a vehicle, said device allowing a progressive and continuous variation in the speed of a driven shaft between no speed and a predetermined maximum speed, comprising in combination, a hydraulic torque converter and a mechanical continuous speed changer, said torque converter having an output shaft coupled to an input shaft of said speed changer, a friction clutch operatively connected between said output shaft of said torque converter and said input shaft of said speed changer, and a mechanical device for reversing the direction of rotation operatively connected between said converter and the output of said mechanical speed changer, the maximum gear reduction ratio $D_v$ of such speed changer and maximum gear reduction ratio $D_c$ of said torque converter being so arranged that $D_v/D_c$ lies between 0.6 and 1.5.

2. A device according to claim 1 wherein said friction clutch is mounted within a casing for said torque converter.

References Cited

UNITED STATES PATENTS

| 2,899,844 | 8/1959 | Hattan | 74—688 |
| 3,082,634 | 3/1963 | Battistin | 74—199 |
| 3,184,990 | 5/1965 | Perry | 74—190.5 X |
| 3,280,657 | 10/1966 | Holdeman | 74—732 |
| 3,316,778 | 5/1967 | Brueder | 74—732 |
| 3,387,507 | 6/1968 | De Castelet | 74—199 X |
| 3,394,617 | 7/1968 | Dickenbrock | 74—730 |

FOREIGN PATENTS

| 399,523 | 10/1933 | Great Britain. |
| 636,542 | 5/1950 | Great Britain. |

OTHER REFERENCES

Willke, H. L., Transmission of Power by Torque Converters.

Product Engineering—Design Digest Issue Mid-October 1957, pp. E2, E3 and E4.

DONLEY J. STOCKING, Primary Examiner

THOMAS C. PERRY, Assistant Examiner

U.S. Cl. X.R.,
74—199, 200, 721